United States Patent
Nicewarner et al.

(10) Patent No.: US 6,497,246 B1
(45) Date of Patent: Dec. 24, 2002

(54) PNEUMATIC SNAP PILOT

(75) Inventors: Ivy J. Nicewarner, Magnolia, TX (US); John J. Frese, Houston, TX (US); James N. Reed, Spring, TX (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/874,918

(22) Filed: Jun. 5, 2001

(51) Int. Cl.[7] .......................... F16K 31/34; F16K 11/10; G05D 16/00
(52) U.S. Cl. ................. 137/413; 137/416; 137/596.14; 137/627.5; 137/596; 251/332; 251/900
(58) Field of Search ......................... 137/85, 412, 413, 137/414, 415, 416, 596, 627.5, 596.14, 488; 251/332, 333, 900

(56) References Cited

U.S. PATENT DOCUMENTS

| | | | |
|---|---|---|---|
| 2,293,068 A | * 8/1942 | McLaughlin | 251/332 |
| 2,409,220 A | 10/1946 | Melichar et al. | 251/121 |
| 2,624,542 A | * 1/1953 | Ghormley | 251/332 |
| 2,929,401 A | 3/1960 | Cowan | 137/516.29 |
| 2,959,188 A | * 11/1960 | Kepner | 251/332 |
| 3,009,476 A | 11/1961 | Usab | 137/516.29 |
| 3,052,254 A | * 9/1962 | Parks | 137/414 |
| 3,078,716 A | * 2/1963 | Winters | 137/413 |
| 3,088,485 A | * 5/1963 | Hanssen | 137/413 |
| 3,091,254 A | 5/1963 | Kilayko | 137/516.29 |
| 3,120,241 A | * 2/1964 | Parks | 137/413 |
| 3,128,784 A | * 4/1964 | Parks | 137/413 |
| 3,134,572 A | 5/1964 | Glasgow | 251/363 |
| 3,346,008 A | * 10/1967 | Scaramucci | 251/332 |
| 3,628,767 A | 12/1971 | Lombard | |
| 3,731,905 A | * 5/1973 | Piet | 251/900 |
| 3,794,075 A | * 2/1974 | Stoll et al. | 251/900 |
| 4,086,936 A | 5/1978 | Vork | |
| 4,131,130 A | 12/1978 | Ruby | |
| 4,182,368 A | 1/1980 | Hartley | |
| 4,436,109 A | * 3/1984 | Taylor | 137/416 |
| 4,474,208 A | 10/1984 | Looney | |
| 4,512,365 A | * 4/1985 | Jacobs et al. | 137/413 |
| 4,699,175 A | * 10/1987 | Anderson et al. | 137/627.5 |
| 4,700,738 A | * 10/1987 | Frese et al. | 137/413 |
| 4,778,595 A | 10/1988 | Sable et al. | |
| 4,875,502 A | * 10/1989 | Romano | 137/627.5 |
| 4,901,754 A | 2/1990 | Sable et al. | |
| 5,158,111 A | * 10/1992 | Lambert et al. | 137/627.5 |
| 5,301,635 A | 4/1994 | Rovira Badia et al. | |
| 5,992,448 A | * 11/1999 | Anderson et al. | 137/413 |

OTHER PUBLICATIONS

Norriseal Catalog. Level Controllers, Series 1001, 1001A, and 1001 XL. 1997.

* cited by examiner

*Primary Examiner*—George L. Walton
(74) *Attorney, Agent, or Firm*—Fellers, Snider, Blankenship, Bailey & Tippens, P.C.

(57) ABSTRACT

A snap pilot used to pneumatically energize and de-energize a control device, such as a valve. The pilot has two valves—one to admit pilot pressure, and one to exhaust pressure. The pilot incorporates valves having an elastomeric seal but maintaining the precision of metal to metal contact. In the preferred embodiment, the elastomeric seal is an O-ring placed in a groove, without adhesive, having only a small amount of deflection when the seat is closed, whereby simultaneous metal-to-metal and elastomer-to-metal contact is achieved.

6 Claims, 3 Drawing Sheets

PNEUMATIC SNAP PILOT

BACKGROUND OF THE INVENTION

1. Field of the Invention

This invention relates generally to pneumatically actuated pilots (also called relays) used to energize or de-energize a control device, and, more specifically, to a snap pilot for use, for example, in a liquid level controller.

2. Background

A snap pilot is typically used to pneumatically energize and de-energize a control device, such as a valve. A conventional snap pilot is comprised of a body having an upper chamber, a middle chamber and a lower chamber; an inlet for receiving a supply gas into the upper chamber; a first valve fluidly connecting the upper chamber with the middle chamber; a gas outlet for passing the supply gas from the middle chamber to the control device; a second valve fluidly connecting the middle chamber with the lower chamber; and an exhaust port for venting gas from the lower chamber. The vented gas is from the control device as it is de-energized. The first and second valves are normally actuated by a thrust pin.

The first valve generally comprises a ball located in the upper chamber that mates with a ball seat machined into the pilot body. The ball controls the flow of gas into the pilot and is held closed with force exerted by supply pressure on the seating area of the ball when the thrust pin is in a non-contacting first position. In a second, ball-contacting position, the thrust pin is used to overcome the force holding the ball seated in order to open flow between the upper and middle chambers.

The second valve typically comprises a spherical segment of the thrust pin which, when in the second position, sealingly engages a second valve seat machined into the pilot body between the middle and lower chambers. Thus, a simultaneous action occurs as force is applied and removed from the thrust pin whereby in the first position the first valve is closed while the second valve is open and whereby in the second position the first valve is open while the second valve is closed.

The pilot ordinarily passes natural gas or other gases including air. The loss of natural gas to the atmosphere has two consequences, degradation of environmental air quality and the loss of value of the exhausted gas. Thus, there is a need to minimize gas leakage from the pilot.

The usual practice has been for the first and second valves to be metal-to-metal contacts. Zero leakage would then occur when the two mating metal surface have perfect continuous contact, which, of course, is difficult to achieve. Past efforts at reducing leakage have included the use of an elastomeric seat seal to improve sealing of the ball against the ball seat. In such pilots, the ball is solely supported by an elastomer with its vertical position affected by the load from the supply gas pressure. The relatively large resiliency of the elastomeric seals usually detracts from the desired crisp snap action. Moreover, the elastomer is typically attached to the pilot body with adhesive that often adversely affects the resiliency of the elastomer. Accordingly, there remains a need to minimize gas leakage from a snap pilot without reducing the performance thereof.

SUMMARY OF THE INVENTION

According to the present invention there is provided an improvement in a snap pilot wherein the pilot allows no leakage while preserving crisp snap action. The inventive snap pilot incorporates a valve having an elastomeric seal therein but maintaining the precision of metal-to-metal contact. In the preferred embodiment, the elastomeric seal is an O-ring placed in a groove within the valve seat, without adhesive, having only a small amount of deflection when the seat is closed, whereby simultaneous metal-to-metal and elastomer-to-metal contact is achieved.

In one aspect, there is thus provided a pneumatically actuated pilot comprised of a body having an upper chamber, a middle chamber and a lower chamber; an inlet for receiving a supply gas into the upper chamber; a first valve fluidly connecting the upper chamber with the middle chamber; a gas outlet for passing the supply gas from the middle chamber to the control device; a second valve fluidly connecting the middle chamber with the lower chamber; an exhaust port for venting gas from the lower chamber; and a thrust pin for actuating the first and second valves; wherein the first valve includes a ball located in the upper chamber that, when in the closed position, simultaneously engages both a valve seat machined into the pilot body and an elastomeric sealing element, preferably an O-ring. The O-ring is strategically positioned in a recess within the valve seat, as aforesaid, such that it is self-restrained and exposed only a small degree. Consequently, near simultaneous contact is achieved between the ball, the O-ring and the valve seat upon closing of the valve and, when closed, the ball sealingly engages both the O-ring and the metallic valve seat.

Although beneficial results may be obtained through the use of the invention, as described above, even more beneficial results may be obtained by providing a like second valve connecting the middle chamber with the lower chamber. In connection with this aspect of the invention, an elastomeric seal, preferably an O-ring, is provided in a recess on the thrust pin shaft at a point immediately adjacent the seat-contacting portion of the thrust pin. Thus, the thrust pin's O-ring contacts the second valve seat immediately prior to lifting the ball. Again, the O-ring is strategically positioned in the recess such that it is self-restrained and exposed only a small degree. Consequently, near simultaneous contact is achieved between the O-ring, the seat-contacting portion of the thrust pin and second valve seat upon closing of the valve and, when closed, both the O-ring and seat-contacting portion of the thrust pin sealingly engage the metallic valve seat.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

DETAILED DESCRIPTION OF THE PREFERRED EMBODIMENT

Figure 1:
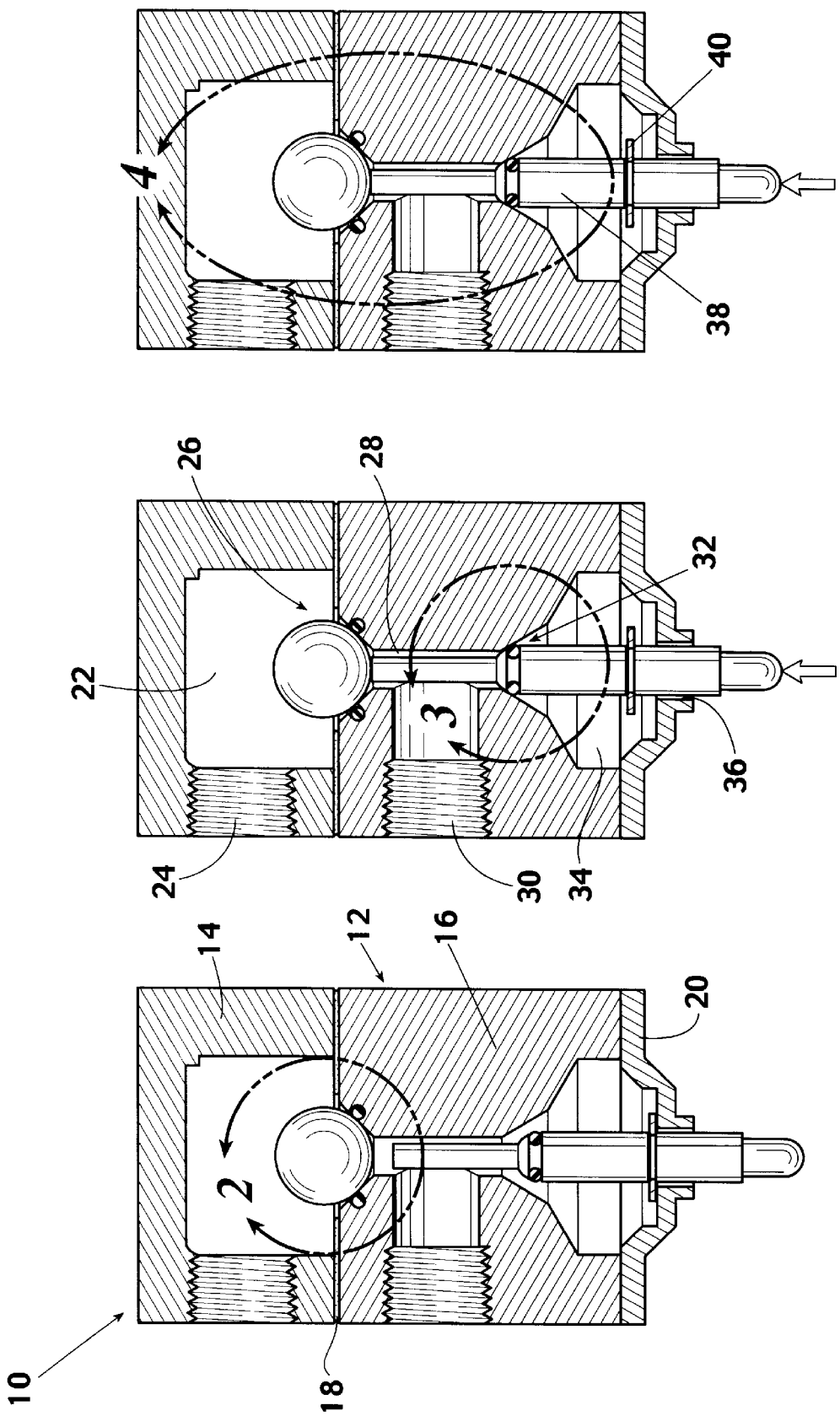
FIGS. 1A–C are sectional views of a snap pilot according to the preferred embodiment of the present invention shown in its first, intermediate, and second positions.

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals designate identical or corresponding parts throughout the several views, the snap pilot or relay is generally indicated by the reference numeral 10. It comprises a body assembly 12 which, in the illustrated embodiment, is composed of a top cap 14 and a body 16 separated by a gasket 18. A bottom cap 20 is affixed to the bottom surface of the body 16. Within the body assembly 12 there is provided an upper chamber 22 which receives a supply gas through a supply gas inlet 24. A first valve, generally indicated by the reference numeral 26, separates the upper chamber 22 from a middle chamber or passageway 28. A gas outlet port 30 fluidly connects with the middle chamber 28 for passing the supply gas from the middle chamber 28 to a control device, such as a control valve. A second valve 32 separates the middle chamber 28 from the lower chamber 34, which lower chamber 34 fluidly communicates with an exhaust port 36. A thrust pin 38 guided by the bottom cap 20 serves to actuate the first and second valves 26 and 32 as further described below. A retaining ring 40 secures the thrust pin 38 within the body assembly 12 of the snap pilot 10.

FIGS. 1A–C illustrate the inventive snap pilot 10 in its various operating positions. FIG. 1A corresponds to a first position (of both the pilot 10 and the thrust pin 38) wherein the first valve 26 is closed while the second valve 32 is open. FIG. 1B, on the other hand, illustrates an intermediate position wherein the thrust pin 38 has been forced upwardly in order to contact the ball 42 while simultaneously closing the second valve 32. Lastly, FIG. 1C exemplifies the invention upon the thrust pin 38 having reached a fully extended second position whereby the first valve is fully open while the second valve is closed.

Figure 2:
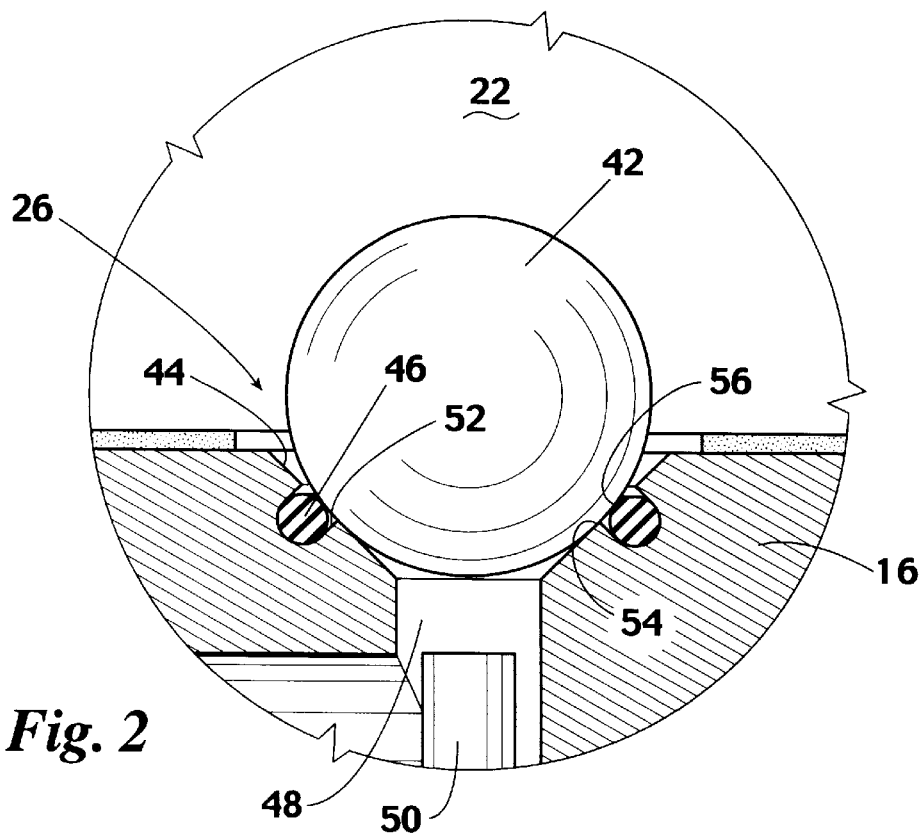
FIG. 2 is an enlarged, partial sectional view taken from FIG. 1A of a ball valve fluidly connecting the upper chamber with the middle chamber when the pilot is in its first position.

As best shown in FIG. 2, the first valve 26 includes a ball 42 located in the upper chamber 22 that, when in the closed position as illustrated, simultaneously sealingly engages a first valve seat 44 machined into the body 16 and an elastomeric sealing element 46, preferably an O-ring. As is evident in FIG. 2, when the first valve 26 is in its closed position there is a space 48 created between an upper shaft portion 50 of the thrust pin 38 and the ball 42. Thus, the supply pressure from the supply gas maintains the ball 42 in its engaged position.

The improvement provided by the present invention encompasses the use of an elastomeric seal within the first valve 26 while maintaining metal-to-metal contact between the ball 42 and the valve seat 44. In this regard, the valve seat 44 is provided with a recess 52 of the depth sufficient so that the O-ring 46 may be self-restrained therein and exposed only a small degree such that when the first valve 26 is in its closed position, the ball 42 simultaneously sealingly engages both a surface portion of the valve seat 44 and the O-ring 46. There is thus provided a contact point 54 between the ball 42 and valve seat 44 and a contact point 56 between the ball 42 and O-ring 46. Thus, it can be appreciated that the O-ring 46 is exposed outside the plane of the valve seat 44 an amount that minimizes deflection of the O-ring while maintaining an adequate sealing surface and while allowing the ball 42 to achieve sealing engagement with a surface portion of the valve seat 44.

Figure 3:
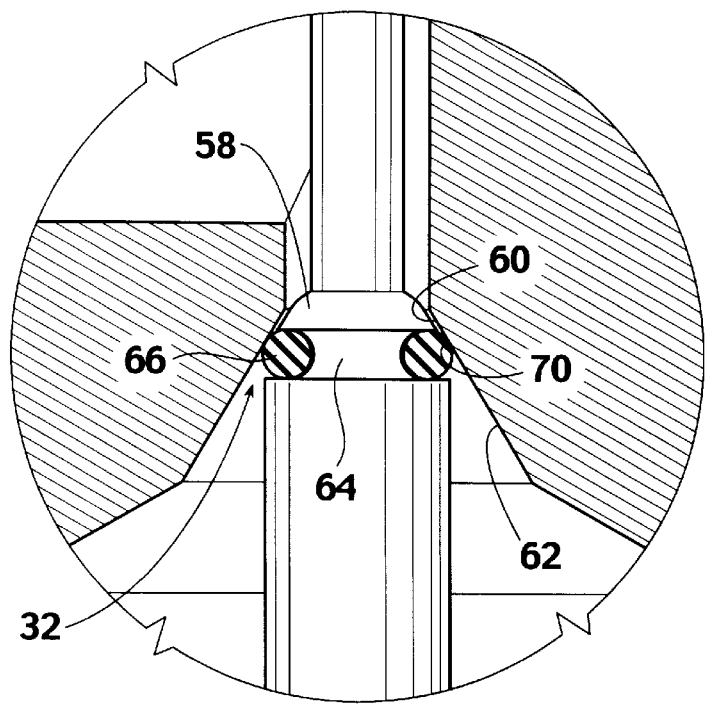
FIG. 3 is an enlarged, partial sectional view taken from FIG. 1B of a valve fluidly connecting the middle chamber with the lower chamber when the pilot is in its intermediate position.

In the intermediate position illustrated in FIG. 1B the thrust pin 38 is forced upward as indicated by the arrow. (If, for example, the inventive pilot 10 is utilized in a liquid level controller, the thrust pin 38 will ordinarily be actuated by the translated movement of a displacer or float.) At this point, as shown more particularly in FIG. 3, there begins a sealing engagement in the second valve 32. The thrust pin 38 includes a seat-contacting portion 58 that moves into abutting relationship with a surface 60 of a second valve seat 62 machined into the body assembly 12. In a second aspect of the preferred embodiment of the present invention, a circumferential recess 64 is provided around the thrust pin 38 at a point immediately adjacent the seat-contacting portion 58 of the thrust pin 38. Within the recess 64 there is seated a second elastomeric sealing element 66, preferably in the form of an O-ring. As the thrust pin 38 is directed upward a near simultaneous contact is achieved between the O-ring 66 and the surface 60 of the second valve seat 62. In a manner similar to that described above in connection with the first valve 26, the recess 64 is of a depth sufficient so that the O-ring 46 may be self-restrained therein and exposed only a small degree such that the outer surface of the O-ring 66 contacts the surface 60 of the valve seat 62 only a fraction of an instant prior to sealing engagement occurring between the seat-contacting portion 58 of the thrust pin 38 and the surface 60.

Figure 4:
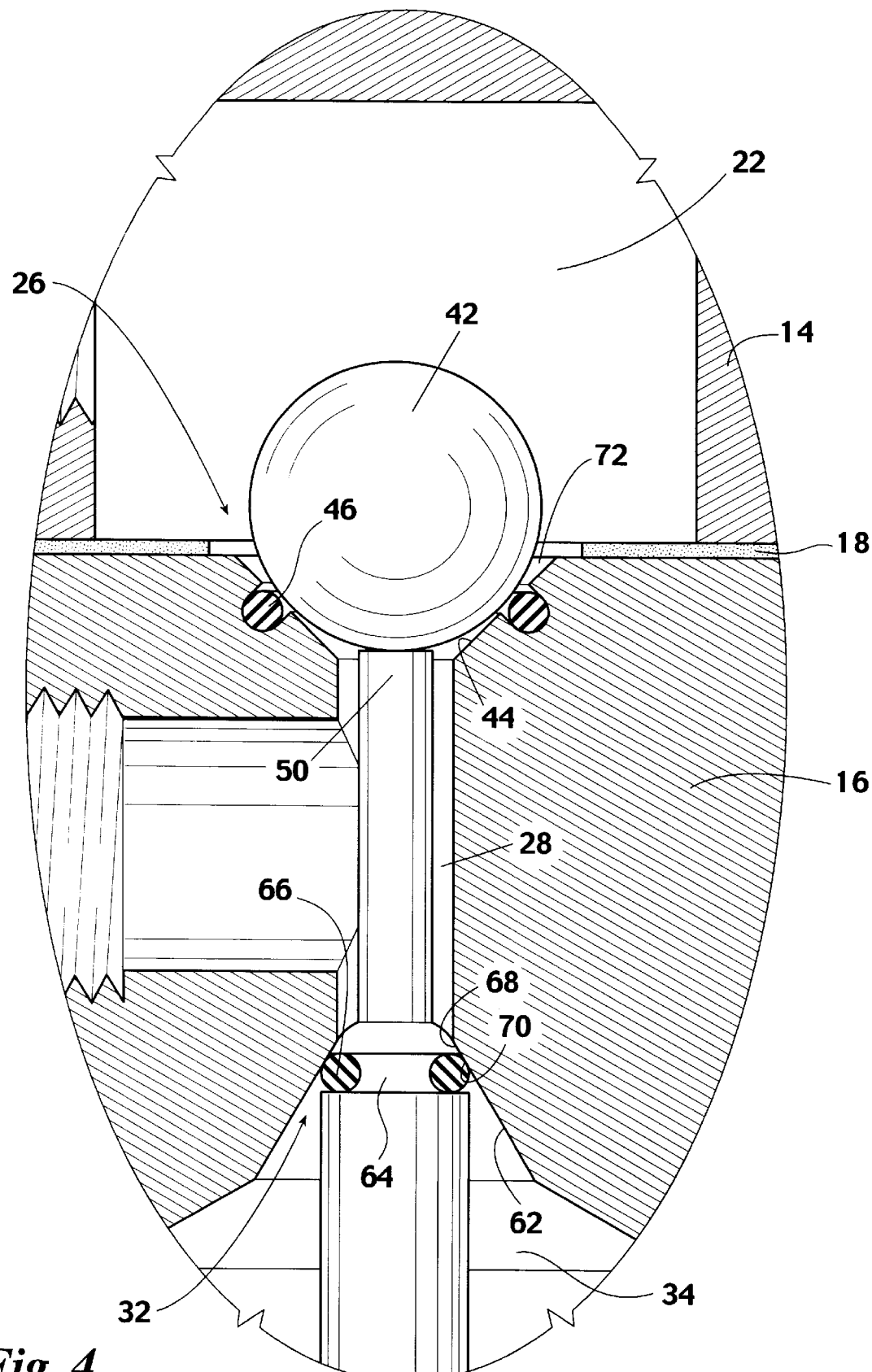
FIG. 4 is an enlarged, partial sectional view taken from FIG. 1C of both valves of the pilot when the pilot is in its second position.

Turning now to FIG. 4, wherein the thrust pin 38 has achieved its second position, it can be seen that with respect to the second valve 32 there is accordingly provided a contact point 68 between the self-contacting portion 58 of the thrust pin 38 and the second valve seat 62 and a contact point 70 between the O-ring 66 and the valve seat 62. Thus, it can be appreciated that the O-ring 66 is exposed outside the plane of valve seat 62 an amount that minimizes deflection of the O-ring while maintaining an adequate sealing surface and while allowing the seat-contacting portion 58 of the thrust pin 38 to sealingly engage the surface portion 60 of the valve seat 62.

Still with respect to FIG. 4, when thrust pin 38 is fully upwardly extended to its second position it can be seen that the upper shaft portion 50 of the thrust pin 38 displaces the ball 42 from the first valve seat 44, including the O-ring 46 such that a fluid passageway 72 is created between the upper chamber 22 and the middle chamber 28.

Consequently, in operation the inventive snap pilot provides leak resistant first and second valves 26 and 32 while maintaining crisp snap action. The thrust pin 38 alternatingly and oppositely opens and closes the first and second valves to admit and exhaust pilot pressure in order to affect control of a control device, such as a valve.

While the inventive pilot may be employed in any number of products directed to the petroleum, marine, steel, and industrial markets, the pilot is especially useful in connection with a liquid level controller, an understanding of which is well known to one of ordinary skill in the art.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A pneumatically actuated apparatus for energizing or de-energizing a control device, comprising:

a body assembly having an upper chamber, a middle chamber and a lower chamber;

an inlet for receiving a supply gas into said upper chamber;

a gas outlet for passing the supply gas from said middle chamber to the control device;

an exhaust port for venting gas from said lower chamber;

a first valve fluidly connecting said upper chamber with said middle chamber, wherein said first valve includes a ball located in said upper chamber that, when said first valve is in a closed position, simultaneously sealingly engages both a surface portion of a first valve seat in said body and an elastomeric sealing element;

a second valve fluidly connecting said middle chamber with said lower chamber, including a second valve seat in said body; and a thrust pin positioned within said body having an upper shaft portion and a seat contacting portion, said thrust pin being movable between a first position and second position, whereby in said first position said upper shaft portion is spaced from said ball allowing for the closure of said first valve and said seat contacting portion is spaced from said second valve seat so that said second valve is open, while in said second position said upper shaft portion displaces said ball to open said first valve and said seat contacting portion sealingly engages a surface of said second valve seat to close said second valve.

2. The apparatus of claim 1, wherein said first valve seat possesses a recess and wherein said elastomeric sealing element comprises an O-ring self-restrained within said recess and exposed only so much to allow for near simultaneous contact of said ball with said O-ring and said surface of said first valve seat upon closing of the valve and, when closed, for the simultaneous sealing engagement of said ball with both said O-ring and said surface of said first valve seat.

3. The apparatus of claim 1, wherein said thrust pin possesses a recess at a point immediately adjacent said seat contacting portion of said thrust pin and further comprising an O-ring self-restrained within said recess and exposed only so much to allow for near simultaneous contact of said O-ring and said seat contacting portion of said thrust pin with said surface of said second valve seat upon closing of the valve and, when closed, for the simultaneous sealing engagement of said O-ring and said seat contacting portion of said thrust pin with said surface of said second valve seat.

4. In a liquid level controller, an improvement comprising a snap pilot according to claim 1.

5. In a liquid level controller, an improvement comprising a snap pilot having:

a valve seat having a recess formed therein;

an o-ring :within said recess;

a ball for selective engagement with said valve seat;

wherein said o-ring protrudes out of said recess in an amount such that said ball simultaneously sealingly engages both a surface portion of said valve seat and said O-ring when said ball is moved into a closed position.

6. In a liquid level controller, an improvement comprising a snap pilot having:

a pin having a seat contacting portion and a circumferential recess formed in said pin;

an o-ring in said circumferential recess;

a valve seat;

wherein said O-ring protrudes out of said recess in an amount such that said seat contacting portion simultaneously sealingly engages both a surface portion of said valve seat and said O-ring when said pin is moved into a closed position.

\* \* \* \* \*